United States Patent [19]

Lai et al.

[11] 4,298,890
[45] Nov. 3, 1981

[54] DIGITAL VERTICAL SYNCHRONIZATION SYSTEM FOR A TELEVISION RECEIVER

[75] Inventors: Stephen Lai, Mt. Prospect; Gopal K. Srivastava, Buffalo Grove, both of Ill.

[73] Assignee: Zenith Radio Corporation, Glenview, Ill.

[21] Appl. No.: 142,291

[22] Filed: Apr. 21, 1980

[51] Int. Cl.³ .............................................. H04N 5/04
[52] U.S. Cl. .................................................... 358/158
[58] Field of Search .......................... 358/148, 154, 158

[56] References Cited

U.S. PATENT DOCUMENTS

| | | | |
|---|---|---|---|
| 3,691,297 | 9/1972 | Merrell et al. | 358/158 |
| 3,916,102 | 10/1975 | Merrell | 358/158 |
| 4,025,951 | 5/1977 | Eckenbrecht | 358/158 |

Primary Examiner—Robert L. Richardson

[57] ABSTRACT

A digital vertical synchronization system for a television receiver has a source of locally generated vertical sync pulses coupled to a vertical sweep system, a source of derived vertical sync pulses developed from and in a time relationship with received television signals, and a phasing circuit for testing the time relationship between the derived vertical sync pulses and the locally generated vertical sync pulses. The phasing circuit outputs a signal indicative of the test. The system includes means responsive to the phasing circuit for adjusting the phase of the locally generated vertical sync pulses, and a mode recognition circuit for determining whether the received television signal includes equalizing pulses in a vertical interval. The mode recognition circuit has an output for indicating whether the digital synchronization system should operate in a standard mode wherein the phase of the locally generated vertical sync pulses is adjusted at a first rate or in a nonstandard mode wherein the phase of the locally generated vertical sync pulses is adjusted at a second rate lower than the first rate. An improvement is disclosed which comprises forced means, associated with the mode recognition circuit and responsive to the phasing circuit output signal, for automatically forcing the mode recognition circuit output to indicate nonstandard mode.

18 Claims, 6 Drawing Figures

DIGITAL VERTICAL SYNCHRONIZATION SYSTEM FOR A TELEVISION RECEIVER

BACKGROUND OF THE INVENTION

The present invention relates to improvements in digital vertical synchronization systems for television receivers, sometimes called "vertical countdown systems." It relates particularly to apparatus in digital synchronization systems for determining whether the system should operate synchronously or asynchronously.

Digital vertical synchronization systems such as those described in Merrell and Hendrickson, U.S. Pat. No. 3,691,297 and Merrell, U.S. Pat. No. 3,916,102, both assigned to the Zenith Radio Corporation, the assignee of this invention, provide locally generated vertical synchronization pulses having relatively constant shape, phase and amplitude. Such locally generated sync pulses, instead of integrated vertical sync pulses, are applied to the vertical sweep generator for controlling raster scan.

The basic system described in those two patents included a source of clock signals applied to a line counter. The line counter counted 525 clock intervals corresponding in rate and in number to 525 lines of the standard NTSC raster scan. The received vertical sync signal was integrated and compared with a 525 count signal to determine whether the line counter was properly in phase with the received vertical sync system and in response thereto, an up/down counter changed state toward one of two extremes. One such extreme represented a maximum confidence condition wherein a succession of properly phased internal clock signals had been produced. In such maximum confidence condition, the line counter continued without alternation of its time relationship to the received vertical sync signals. However, when a certain succession of internally developed vertical sync signals did not coincide with the integrated vertical sync signal, so that the counter reached its other extreme condition representing a minimum confidence level, then the system reset the counter to be in a proper phase relationship with the integrated vertical sync signal.

In that system, a problem arose when the television receiver accepted input signals from sources other than over-the-air television transmissions, such as cable television. Over-the-air broadcasts conform, in the United States, to NTSC standards and provide vertical sync pulses at a specified rate. Those transmitted vertical sync pulses are referred to as "standard," that is, occurring at the designated NTSC rate. Cable television systems and other sources sometimes communicate vertical sync pulses which are not at the NTSC specified rate. Such signals are referred to as nonstandard. To conpensate for such nonstandard signals, the digital vertical sync system described in the above-mentioned Merrell U.S. Pat. No. 3,916,102 included means within the phase lock system for maintaining the counter at its minimum confidence level during reception of nonstandard signals. As a result, the 525 pulse counter was reset with each received integrated vertical sync signal.

A "mode recognition" circuit was included in the prior art system to determine whether the digital vertical sync system should enter the standard mode or the nonstandard mode. Inasmuch as NTSC broadcast signals include certain equalizing pulses during specific times within the vertical interval, the system counted the number of equalizing pulses received during a specific interval. If nine or more equalizing pulses were counted by the mode recognition circuit, the synchronization system operated in a standard mode. On the other hand, if fewer than nine equalizing pulses were detected by the mode recognition circuit, the synchronization system entered a nonstandard mode. This was done on the premise that if an NTSC signal was being received, it was standard. Conversely, if a non-NTSC signal was being received, nonstandard signals were most likely.

Such a system has not been completely satisfactory due to the increasing use of devices such as consumer video tape recorders with playback speed selection. When a consumer records a broadcasted television program, equalizing pulses during the vertical interval are recorded. When the tape is replayed, the mode recognition circuit of the digital vertical synchronization system is tricked: it counts nine or more equalizing pulses and enters the standard mode. The vertical synchronization would be proper, in that case, if the video taper recorder plays back at the proper speed and without jitter, wow or flutter, but not using fast, slow or still motion. However, when the playback speed varies, the mode recognition circuit will not detect a change and the television receiver will display an image which rolls or loses sync and is generally difficult to view. One solution to that problem is to force the synchronization system into the nonstandard mode by a manual adjustment ("forced mode"). This manual adjustment, however, is not readily practicable for home consumers.

Therefore, one object of the present invention is to provide a digital vertical synchronization for a television receiver system which properly operates with either standard or nonstandard vertical sync signals.

Another object is to provide such a synchronization system which automatically enters a nonstandard mode if a television signal is inputted to the receiver having vertical sync signals at a non-standard rate, regardless of the number of equalization pulses in the vertical interval of such inputted composite signal.

When a digital vertical synchronization system operates in a nonstandard mode, its immunity to noise is substantially degraded as compared with its immunity during the standard mode. Accordingly, a further object of the present invention is to provide a digital vertical synchronization system as set forth above which improves the noise immunity of the system.

BRIEF DESCRIPTION OF THE DRAWINGS

The features of the present invention which are believed to be novel and inventive are set forth with particularly in the appended claims. The invention, together with further objects and advantages thereof, may be best understood by reference to the following detailed description taken in conjunction with the accompanying drawings wherein:

DESCRIPTION OF A PREFERRED EMBODIMENT

Figure 1:
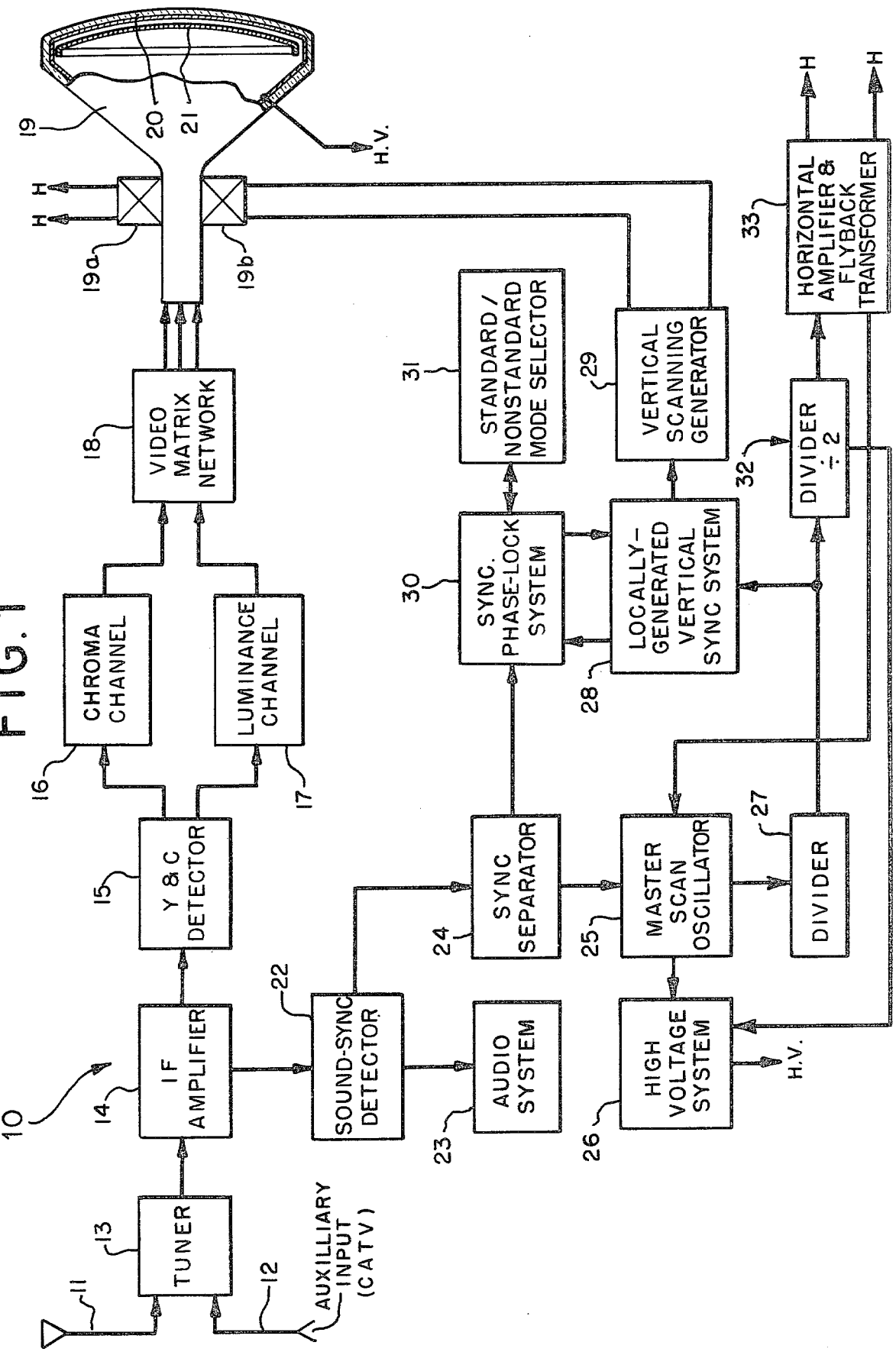
FIG. 1 is a block diagram of a television receiver including a digital vertical synchronization system according to the preferred embodiment of the present invention.

Referring now to FIG. 1, a color television receiver 10 is shown which incorporates a standard/nonstandard phase lock arrangement for a digital synchronization system in accordance with the present invention. The receiver includes an antenna 11 which intercepts telecast signals and couples them to an input tuner stage 13. Alternatively, signals may be applied to the input tuner stage 13 through an auxiliary input 12 connected, for example, to a cable television network. At tuner stage 13, a particular received signal is selected, amplified and converted to an intermediate frequency in the well known manner before being coupled to an intermediate frequency (IF) amplifier 14 where it is further amplified. The processed signal is then coupled to a luminance (Y) and chrominance (C) detector 15 and to a sound-sync detector 22.

The detected chrominance information from Y and C detector 15 is connected to a chroma channel 16 which develops the signals R-Y, B-Y and G-Y that are applied to the video matrix network 18 as one of the informational inputs thereto. The detected luminance information from detector 15 is similarly connected to a luminance channel 17 wherein the luminance signals are processed prior to application to the video matrix network 18, forming the other of its informational inputs. Appropriate matrixing occurs within matrix network 18 such that signals containing the correct brightness, hue and color saturation information are derived and applied to the appropriate control electrodes of the image reproducer 19 in a manner understood in the art.

The image reproducer 19, which for illustrative purposes only is shown to be a conventional shadow mask cathode ray tube, includes a tri-color image screen or target 20 to be scanned by a group of three electron beams developed by individual guns housed with the tube itself. A parallax mask 21 is included in the cathode ray tube 19 to restrict the electron beams generated by the guns in a known manner, so that each beam is permitted to strike only phosphor dots of a single color on image screen 20. The electron beams are suitably modulated by the luminance and chrominance information such that their traverse of screen 20 results in the production of a visual image. Since the parallax of shadow mask 21 enables each electron beam to see but a single color phosphor on its traverse of screen 20, the reproduction is, in fact, that of three image fields effectively superposed to yield an image in simulated natural color. Although the color signals R, G and B are applied directly to the three cathodes of picture tube 19, in the embodiment of the receiver as herein shown, it should be understood that other systems are equally compatible such as those receivers designed to utilize color-difference signals. The type of chroma processing is not directly related to the subject matter of the present invention and is in no way critical to its operation.

Sound-sync detector 22 is coupled to a audio system 23 having appropriate circuitry for reproducing the audio protion of the received signal. Sound-sync detector 22 is further coupled to a sync separator 24 wherein the sync portion of the received signal is stripped from the composite video signal to develop horizontal and vertical synchronization pulses. The horizontal sync pulses, which occur at a 15.734 kHz rate, are inputted to a master scan oscillator 25 which cooperates with dividers 27 and 32 to provide signals to a horizontal amplifier and flyback transformer 33. Block 33 developes horizontal (line) scanning signals for application to the appropriate deflection yoke 19a positioned on the image reproducer 19. The output of divider 32 is further coupled to a high voltage system 26 which develops a high voltage accelerating potential for application to the cathode ray tube 19. The divider 27 provides a train of clock pulses occurring at a 31.5 kHz rate to a vertical synchronization system 28 to develop locally generated vertical (60 Hz) sync pulses. The locally generated vertical sync pulses are then coupled to a vertical scanning generator 29 wherein appropriate scanning (field) signals are developed for application to deflection yoke 19b.

A synchronization phase lock system 30 operable in either standard or nonstandard mode is coupled to sync separator 24 and receives vertical sync pulses therefrom. A standard/nonstandard mode selector 31 is connected to the phase lock system 30 for determining in which mode the digital vertical sync system will operate. During standard operation, a signal from the locally generated vertical sync system 28 is applied to phase lock system 30 so that coincidence or non-coincidence of the locally generated sync pulses and the received vertical sync pulses may be determined. Upon finding a non-coincident condition for an illustrative predetermined number of vertical fields, phase lock system 30 will generate a correction signal that is applied to the locally generated sync system 28 for correcting its phase to be coincident with the received vertical sync pulses. During nonstandard operation, however, the phase lock system 30 generates a correction signal for each vertical field and applies it to the locally generated sync system 28, rephasing it to coincide with the received vertical sync pulse for each field.

In typical mode selection and synchronization circuitry, a "line counter" is clocked by signal provided from divider 27. The line counter provides pulses which ultimately comprise or initiate an internally generated vertical synchronizing signal. Such pulses from the line counter are periodically compared with pulses derived from the vertical sync pulses inputted to the television receiver. If a certain number of counts from the line counter do not correspond or register in time properly with such "derived" vertical sync pulses, i.e., the phase becomes improper, then the line counter will ultimately be reset in time with respect to the derived vertical sync pulses. The system will then continue until the phase again shifts, whereupon the system will be reset. Merrell et al, U.S. Pat. No. 3,691,297, and Cox, Hendrickson, Merrell, "Digital Vertical Sync System," *IEEE Transactions on Consumer Electronics*, Vol. CE 23 No. 3 (August 1977) (hereinafter "Cox et al. [IEEE 1977]"), whose disclosures are hereby incorporated herein, describe apparatus and manner by which this is accomplished. The mode of operation is called "standard" which denotes that the line counter is permitted to continue running and is periodically reset without a change in phase after a predetermined number of lines (specifically, 525 lines for an NTSC television system). The line counter is adjusted with a phase change from time to time if it drifts significantly from a proper phase relationship with respect to the derived vertical sync pulses.

As mentioned above, a digital vertical synchronization system should operate in a "nonstandard" mode if there is some problem with the vertical synchronizing pulses inputted to the television receiver. Such problems may develop as a result of replay from a video tape recorder or inputting signals from a cable television transmitter. In the nonstandard mode, the line counter is reset more frequently than in the standard mode.

U.S. Pat. No. 3,916,102 to Merrell, and Cox et al (IEEE 1977) disclose one apparatus and manner by which mode can be recognized. Such apparatus develops a pair of signals S and its complement $\overline{S}$ which indicate whether the system is to operate in standard or nonstandard mode. If equalizing pulses are received, the synchronization system should be set, at least initially, to operate in standard mode, where the S signal is set to a logical high (H) while $\overline{S}$ is set to a logical low (L). Conversely, when equalizing pulses are not detected, the digital vertical synchronization system is set, at least preliminarily, to a nonstandard mode where the S signal is at a logical low (L) while the $\overline{S}$ signal is at a logical high (H).

THE SIMPLIFIED BLOCK DIAGRAM

The illustrated Figures develop various signals, such as S and $\overline{S}$ as mentioned supra. In describing the Figures, the convention will be used wherein a given "signal" will mean the logical high state of an output having the same designation. Thus, the "S signal" means the time during which the state of the circuit point or output S is set is at a logical high.

Figure 2:
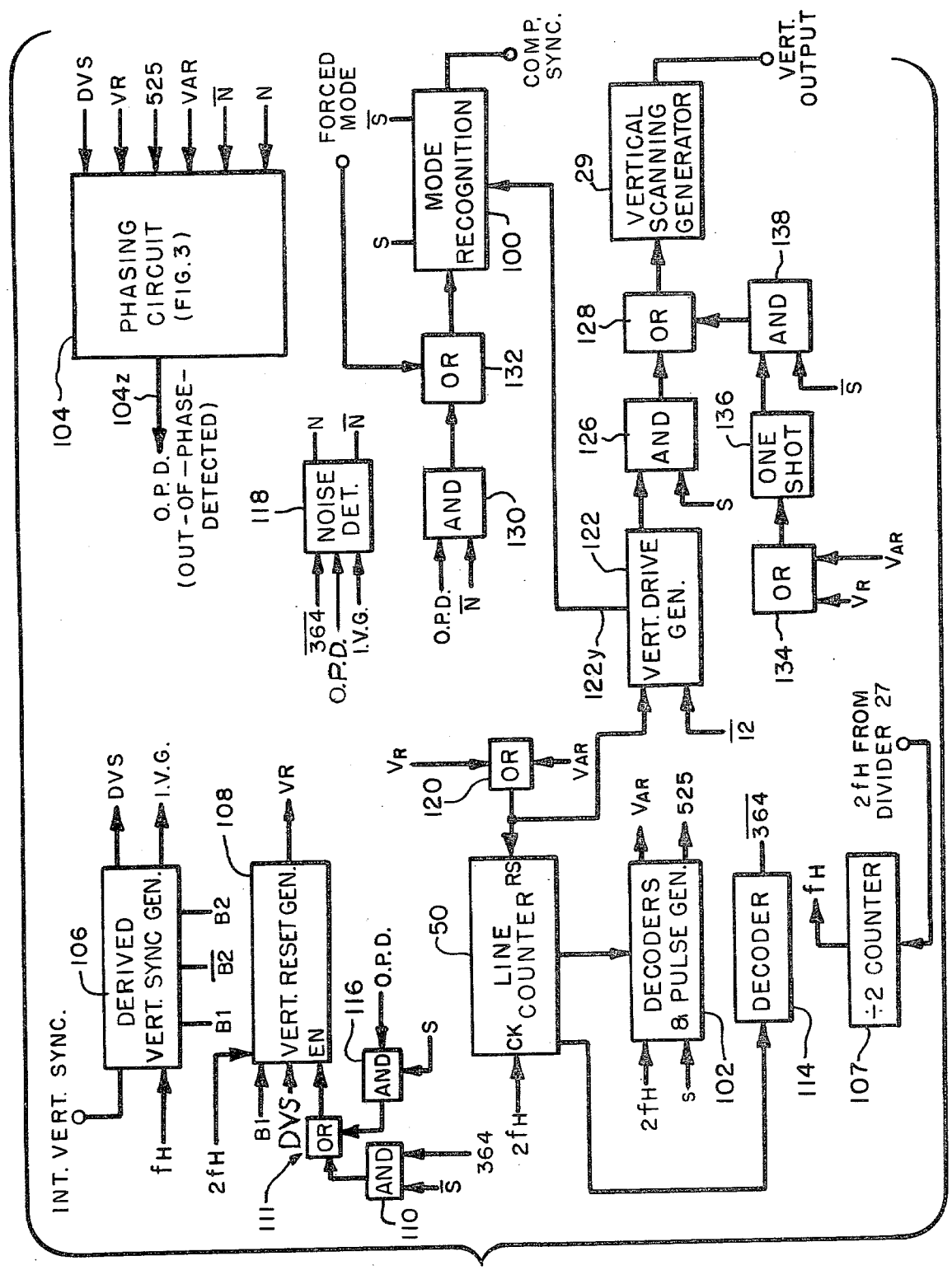
FIG. 2 is a simplified block diagram illustratively showing the digital vertical synchronization system of FIG. 1.
Figure 6:
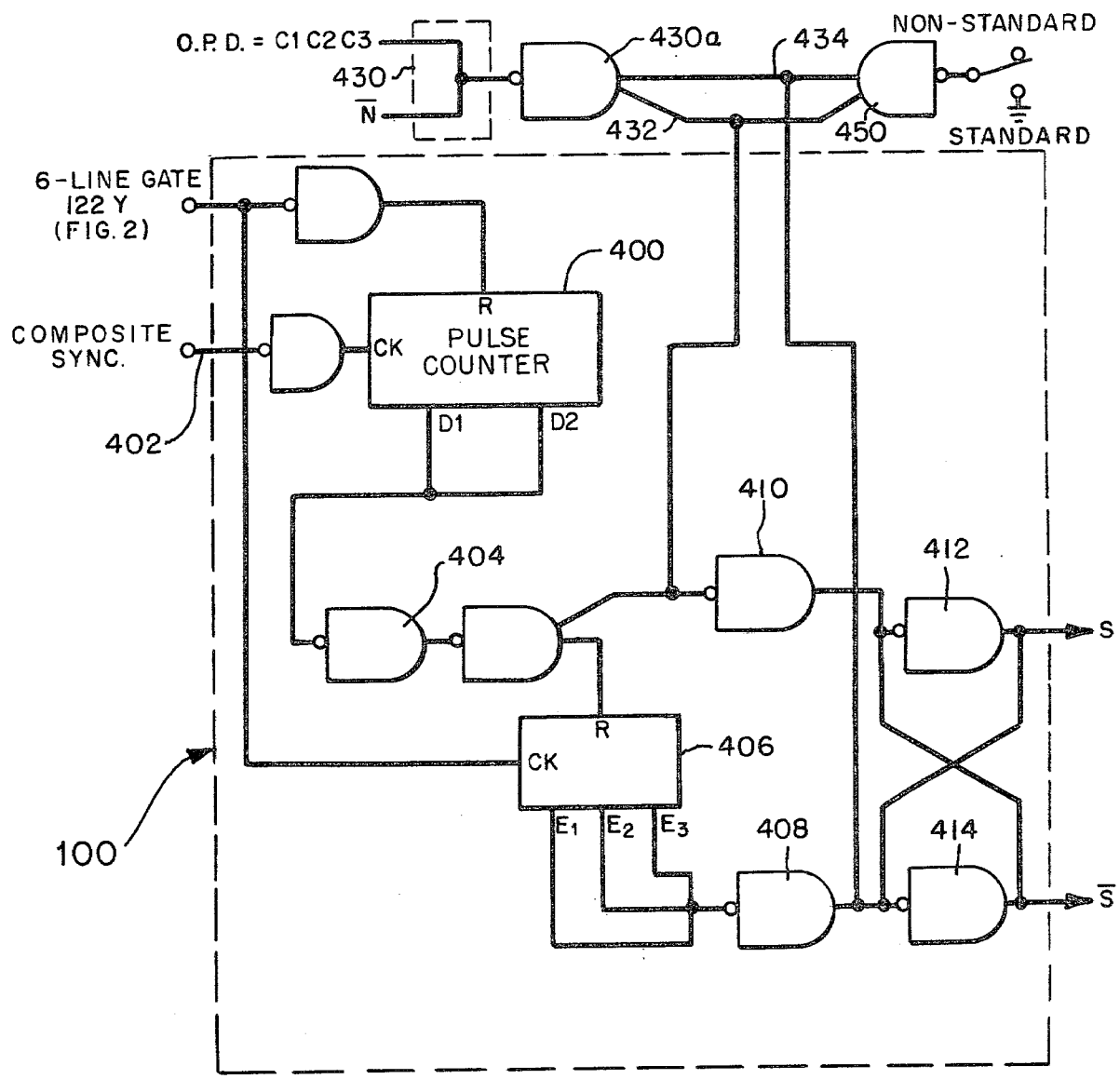
FIG. 6 is a circuit diagram in I²L notation of an illustrative mode recognition circuit and connections thereto shown as a block in FIG. 2.

Turning to FIG. 2, equalizing pulses are detected by a mode recognition circuit 100, illustratively of the type described in Merrell, U.S. Pat. No. 3,916,102 and Cox et al. (IEEE 1977). The coupling of mode recognition circuit 100 in the illustrated embodiment is augmented over that of Merrell and Cox, and FIG. 6 shows such coupling.

The line counter may comprise, illustratively, a ten or more stage binary counter 50. Counter 50 has various outputs which are applied to a decoder and pulse generator 102. Decoder and pulse generator 102 additionally receives, as inputs, clock pulses and the S signal whose state indicates the standard or nonstandard mode. Decoder and pulse generator 102 has a "525" output which, when high, signals that 525 counts of counter 50 have transpired. Further, for purposes which will be explained later, decoder and pulse generator 102 outputs a variable signal VAR on another output lead, as shown. The VAR output is normally low and when high, signals 525 counts of counter 50 in standard mode and 684 counts in nonstandard mode.

The 525 output represents the phase of the locally generated vertical synchronization pulses. A phasing circuit 104 determines whether the locally generated vertical sync pulses are in proper phase with the vertical sync pulses inputted to the television receiver. Comparison could be made with the integrated vertical sync. However, as set forth particularly in Cox et al. (IEEE 1977) and Merrell, U.S. Pat. No. 3,916,102, the integrated vertical sync signal may have slow rise and fall times, low amplitude, and irregular pulse width, and it therefore benefits from further processing. This occurs in a derived vertical sync generator 106 having a DVS output which carries a signal representative of integrated vertical sync pulses. Generator 106 receives as inputs integrated positive composite sync and clock pulses at the raster scanning rate ($f_H$). The signals of the $f_H$ rate are provided by a counter 107 which receives clock pulses from clock pulse generator 27 (FIG. 1) and reduces their rate by one-half.

Phasing circuit 104 receives several other inputs including VAR, DVS, and the following outputs which will be described below: Vr, N and $\overline{N}$. Phasing circuit 104 operates on these various signals and sets an output "O.P.D." high if an out-of-phase condition is detected. If an out-of-phase condition is not detected, the output "O.P.D." of phasing circuit 104 will be low.

The "VR" input to phasing circuit 104 is the output of a vertical reset generator 108 which receives as one input the derived vertical sync output DVS. Generator 108 is enabled by the output of an AND gate 110 whose two inputs are the $\overline{S}$ signal and a 364 signal outputted by a decoder 114 coupled to line counter 50. The 364 signal represents whether counter 50 has counted 364 counts. It will be understood from the description which follows that the vertical reset output VR is set high once during every frame in the nonstandard mode and in the standard mode only after a significant drift in the phase relationship of counter 50 with the vertical sync pulses of the received television signal.

As mentioned, phasing circuit 104 also receives inputs "N" and "$\overline{N}$" which are outputs of a noise detector 118. The noise detector receives signals "I.V.G." from the derived vertical sync generator 108, the O.P.D. signal from phasing circuit 104, and a timing signal from decoder 114. The purpose of the noise detector is to force the vertical countdown system to operate in standard mode. Therefore, once the vertical countdown system is in standard mode, there is no need for the noise detector and it is disabled. The noise detector, on detecting two or more vertical sync pulses within a period of 364 counts, will set N to high and $\overline{N}$ to low, denoting a noise condition. When noise is absent, N is set low and $\overline{N}$ is set high.

From FIG. 2 it can be seen that if mode recognition circuit 100 determines that equalizing pulses are present and therefore enters standard mode, $\overline{S}$ will be set low and generator 108 will not emit a vertical reset signal VR unless an out of phase condition is detected.

In such standard mode, counter 50 will reset after each 525 counts. The reset input of counter 50 is coupled to the output of an OR gate 120 whose inputs are both the VR and the VAR outputs. In standard mode, VR is normally low, but the VAR output goes high with each 525 counts of line counter 50. Thus, counter 50 is reset by high VAR signals after 525 counts (in standard mode).

The output of OR gate 120 is used also to trigger a vertical drive generator 122 which, upon receipt of a high signal from OR gate 120, generates a pulse which terminates upon receipt of a signal "$\overline{12}$" indicating that twelve counts have transpired in counter 50, i.e., the duration of six lines of horizontal scan. Such pulse is applied to vertical scanning generator 29 via an AND gate 126 in series with an OR gate 128. In standard mode, the VAR signals constitute the locally generated vertical synchronizing pulses. They are extremely stable and substantially immune from noise because they are based on the regular digital counting of counter 50.

If the phase of counter 50 should drift significantly from its proper relationship with the derived vertical sync pulses DVS, the system will correct the error by use of the vertical reset generator 108, which will be enabled as follows.

The out-of-phase condition is indicated by output "O.P.D." of phasing circuit 104 going high. The output of an AND gate 116 will go high as a result thereof, given that the system is in standard mode. This high signal enables vertical reset generator 108 via OR gate 111, as shown in FIG. 2.

Further, in a no noise condition, where $\overline{N}$ is set high, the high O.P.D. signal will pass through and AND gate 130 to the mode recognition circuit 100 via an OR gate 132. In response to this signal, mode recognition circuit 100 will be automatically forced to signal the nonstandard state, where $\overline{S}$ is set high. AND gate 110 will be enabled by the 364 signal and the $\overline{S}$ signal to enable the vertical reset generator 108 via OR gate 111.

In presence of noise, where $\overline{N}$ is low, the O.P.D. signal will not cause mode recognition circuit 100 to set $\overline{S}$ high. In this case S is high and therefore O.P.D. will enable vertical reset generator 108 via OR gate 111.

Once the reset generator 108 is enabled, it will be triggered by a pulse B1 from generator 106 during the derived vertical sync pulse DVS which, it will be recalled, is directly related to the sync pulse inputted to the television receiver, whether from a broadcast station, cable television video tape recorder, or other signal source. This rephases the system.

The system, it will be recalled, will at this time be in a nonstandard mode. Because S will be low, AND gate 126 will not pass signals to vertical scanning generator 29. However, the generated vertical reset signal VR actuates vertical scanning generator 29 via an OR gate 134 which triggers one shot 136 whose output passes through an AND gate 138. Gate 138 receives as one input the $\overline{S}$ signal, and this will allow the output of one-shot 136 to pass to OR gate 128, ultimately to scanning generator 29.

By this action of resetting the line counter 50 to proper phase, the phasing circuit 104 will eventually determine, as set forth more particularly below, that there is no longer an out-of-phase condition. It will drop its O.P.D. output to low, and the forced nonstandard mode requirement will be withdrawn, permitting standard operation again. The S signal will once again return to high (H), while the $\overline{S}$ signal will return to low (L).

The foregoing describes what happens in the illustrated system when starting in standard mode, as determined by mode recognition circuit 100 responding to equalizing pulses. In the event that the mode recognition circuit 100 does not detect the normal number of equalizing pulses which are normally associated with broadcast television, it will enter the nonstandard mode and set $\overline{S}$ to high. As discussed above, this will enable the vertical reset generator 108 via gate 110. Also, the input to vertical scanning generator 29 will be based on the derived vertical sync pulses DVS which directly correspond to the vertical sync pulses of the received television signal.

THE PHASING CIRCUIT

Figure 3:
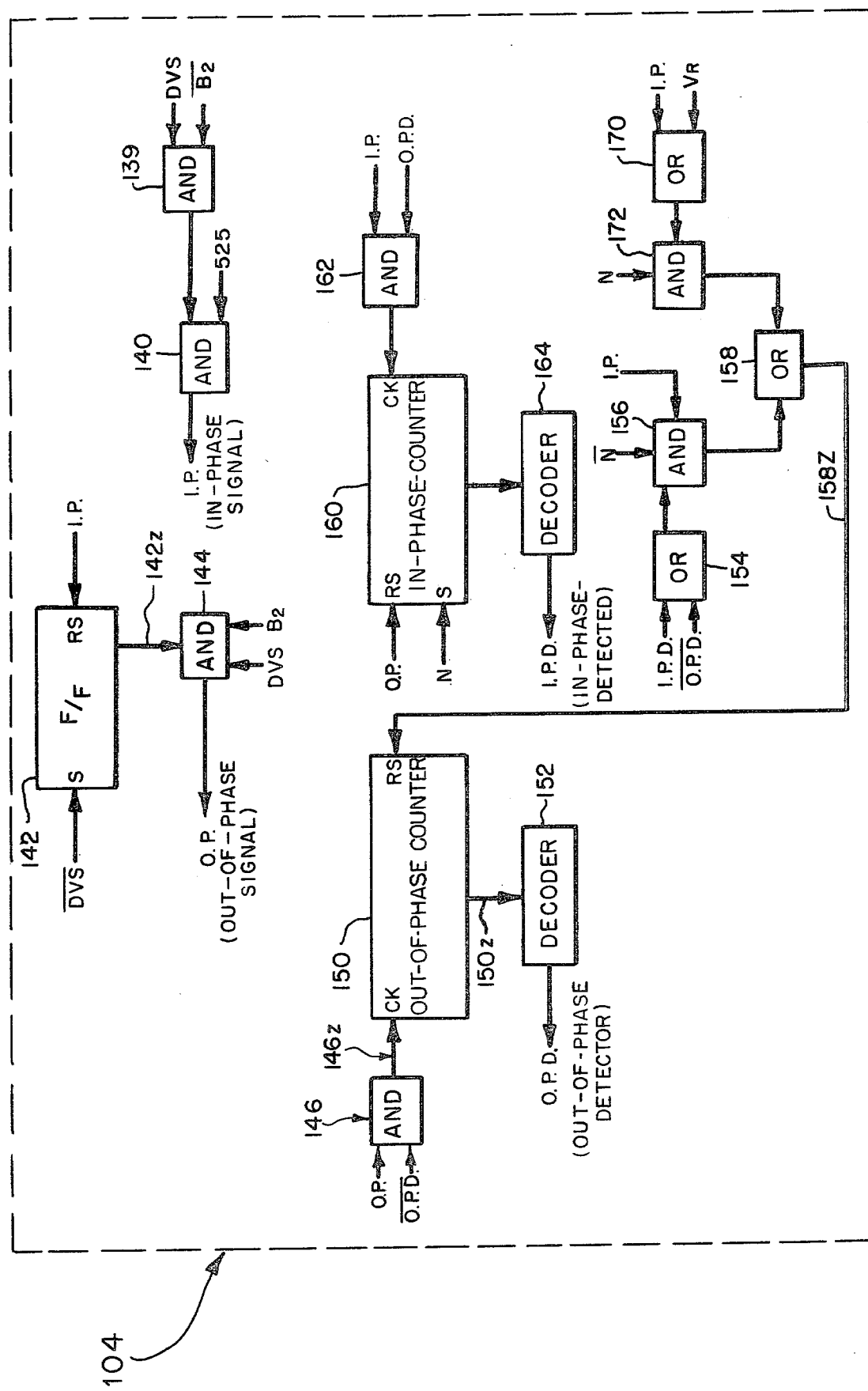
FIG. 3 is a simplified block diagram of an illustrative embodiment of the phasing circuit shown as a block in FIG. 2.

FIG. 3 is a simplified block diagram illustrating the phasing circuit 104 of FIG. 2. Referring to FIG. 3, and in-phase detector comprises an AND gate 140 which receives a $\overline{B}_3 \overline{B}_2$ signal from an AND gate 139. AND gate 139 receives the signals DVS ($\overline{B}_3$) and $\overline{B}_2$ from derived vertical sync generator 102. Detector 140 also receives the 525 signal from decoder and pulse generator 102. If these two input signals overlap in time, then an output "I.P" of AND gate 140 will be high to indicate that the line counter 50 is properly in phase with the derived vertical sync pulses and, therefore with the received television signal.

The output I.P. of AND gate 140 is applied to the reset input of an RS type flip flop 142. The "set" input of flip flop 142 is coupled to the $\overline{DVS}$ output of derived vertical sync generator 106 (FIG. 2). An output 142z of flip flop 142 is low when I.P. is high. Output 142z is coupled to one input of an AND gate 144 whose output O.P. goes high to indicate an out-of-phase occurrence and is otherwise low.

In operation, if AND gate 140 determines that the 525 pulse and the derived vertical synchronization pulse are in phase, the output 142z of flip flop 142 will drop to low. This disables gate 144 and thus, the out-of-phase signal O.P. will be low.

An AND gate 146 receives the O.P. signal and to O.P.D. sigal. If so far, the out-of-phase condition has not been detected, then $\overline{O.P.D.}$ will be high and gate 146 will be enabled. This allows a high O.P. signal to clock an out-of-phase counter 150 whose output 150z is applied to a decoder 152. The output "O.P.D." of decoder 152 is normally low, but goes high to indicate an out-of-phase condition after counter 150 reaches a certain state. Illustratively, decoder 152 goes high after counter 150 reaches state seven of its count.

Apparatus is provided so that O.P.D. goes high after a sequence of only consecutive out-of-phase occurrences. Such apparatus illustratively includes an OR gate 154, one of whose inputs is $\overline{O.P.D.}$. Its output comprises one input to an AND gate 156 which receives as other inputs the $\overline{N}$ and I.P. signals. The output of gate 156 is inputted to an OR gate 158 whose output is coupled to a reset input RS of out-of-phase counter 150. Consequently, before decoder 152 sets the O.P.D. signal high, $\overline{O.P.D.}$ will be high and will pass through OR gate 154. If an in-phase occurrence (I.P. high) is detected by AND gate 140, the output of AND gate 156 will go high (in a no noise condition) and reset out-of-phase counter 150 back to its starting count. As a result, the output O.P.D. of decoder 152 stays low.

Once the O.P.D. goes high to indicate the detection of the predetermined number of consecutive out-of-phase occurrences, the FIG. 3 circuit will require a second predetermined number of in-phase occurrences before returning O.P.D. to low, that is, before removing a forced nonstandard mode. Specifically, when O.P.D. goes high, $\overline{O.P.D.}$ goes low to disable AND gate 156 unless an "I.P.D." signal is inputted to OR gate 154. Once AND gate 156 is disabled, then in a no noise condition the output of OR gate 158 will remain low and not reset out-of-phase counter 150.

A high state of the I.P.D. signal indicates the detection of a predetermined number of consecutive in-phase occurrences. Circuitry for its generation operates in a manner analogous to the operation of out-of-phase counter 150 and its supporting circuit elements. An in-phase counter 160 has a clock input which receives the output of an AND gate 162. The inputs to gate 162 are the output I.P. of AND gate 140 and the output O.P.D. of decoder 152. The output of gate 162 is high only when both I.P. and O.P.D. are high. After counter 160 reaches a predetermined state, which in the preferred embodiment is a count of seven, the output I.P.D. of an associated decoder 164 goes high.

Analogous to the same feature of out-of-phase counter 150, the in-phase detected output I.P.D. responds only to a predetermined number of consecutive pulses. Thus, a reset input RS of counter 160 is coupled to the output O.P. If will be recalled that the output 142z of flip flop 142 is normally high but changes to low upon an in-phase occurrence. In the absence of an in-phase occurrence, the high output of flip flop 142 will pass through AND gate 144 to reset the in-phase counter 160. Consequently, only a succession of in-phase signals will permit in-phase counter 160 to reach the state which decoder 164 will recognize. After that state is reached, I.P.D. will go high.

Such high I.P.D. signal will pass through OR gate 154 and enable AND gate 156. The next high I.P. signal will pass through gates 156 and 158 to reset the out-of-phase counter 150. That, in turn, changes the output O.P.D. of decoder 152 to low. As discussed above with respect to FIG. 2, this will remove the automatic forced mode requirement.

CONSEQUENCES OF NOISE DETECTION

The foregoing descriptions of FIGS. 2 and 3 have been with respect to a no noise condition. The system illustrated herein provides improved noise immunity by automatically switching the system to standard mode in the presence of noise. This is done on the premise that nonstandard signals are not boradcasted and are from a local source. Such signals are strong and normally free of noise. Consequently, if noise is detected, the system should operate in the standard mode.

It will be recalled that the noise detector 118, on detecting two or more pulses which it considers to be vertical sync signals within a period of 182 lines, will set N to high. This enables an AND gate 172 (FIG. 3) and disables AND gate 130 (FIG. 2) and AND gate 156 (FIG. 3). The output of OR gate 132 will stay low and therefore will not automatically force the mode recognition circuit 100 into the nonstandard mode. Mode recognition circuit 100 will then be free to operate normally and unconstrained. It should be noted, however, that if there is noise on the integrated vertical sync, then there is probably noise also on the composite sync inputted to mode recognition circuit 100. Noise in the composite sync signal will cause mode recognition circuit 100 to detect an excess of pulses in the six line test period, which it will interpret as equalizing pulses. It will consequently enter the standard mode and set S to high. The AND gate 156 will be disabled and AND gate 172 enabled. Therefore, the reset for the out-of-phase counter 150 will be either I.P. or VR. Therefore, in the presence of noise, the system does not wait for eight consecutive in-phase signals. Instead, the very first in-phase signal will reset the out-of-phase counter 150 and will return the system to the standard mode of operation. Similarly, the vertical reset pulse which resets the line counter 50 will also reset the out-of-phase counter 150 and thus return the system to the standard mode of operation.

It is possible that while the system is operating in standard mode, it both: (a) drifts out of phase from the derived vertical sync pulses DVS, and (b) detects noise. But for such noise, the system, without a noise detector, would recognize out-of-phase occurrences (set O.P. high), enter out-of-phase condition (set O.P.D. high), and ultimately force the mode recognition circuit 100 into nonstandard mode via AND gate 130 and OR gate 132. With noise detected (N set low), however, that remedy is precluded by the disablement of AND gate 130.

The system does provide for that contingency. If the locally generated sync pulses drift from proper phase, the six-line enablement period of mode recognition circuit 100 will correspondingly drift. Ultimately, the enablement period will be so out of time registration with the equalizing pulses of composite sync that fewer than nine equalizing pulses (or any other number which is predetermined) will be detected. The mode recognition circuit 100 then will enter nonstandard mode. As discussed above, this will ultimately cause the line counter 50 to reset at the proper phase. This adjustment process, in the embodiment illustratively described herein, reaches the standard to nonstandard mode conversion after several frames. Then, line counter 50 having been reset to a proper phase, equalizing pulses of the composite sync of the received television signal will again be in proper time registration with the six line enablement period of mode recognition circuit 100. Consequently, circuit 100 will return the digital vertical synchronization system to standard mode.

SYSTEM IMPLEMENTATION

The remaining figures illustrate an implementation of the phasing circuit 104 (FIG. 4), noise detection circuit 108 (FIG. 5), and mode recognition circuit (FIG. 6) of FIGS. 2 and 3. The preferred implementation of the invention is an integrated circuit using integrated-injection logic ($I^2L$) because $I^2L$ permits linear circuits to be included on the chip. Accordingly, FIGS. 4, 5 and 6 use standard $I^2L$ notation. It will be understood by those skilled in the art that the present invention can be embodied in a variety of forms, integrated or otherwise, and if integrated, could be implemented in transistor-transistor logic (TTL) or emitter-coupled logic (ECL), or otherwise as a designer may select.

Figure 4:
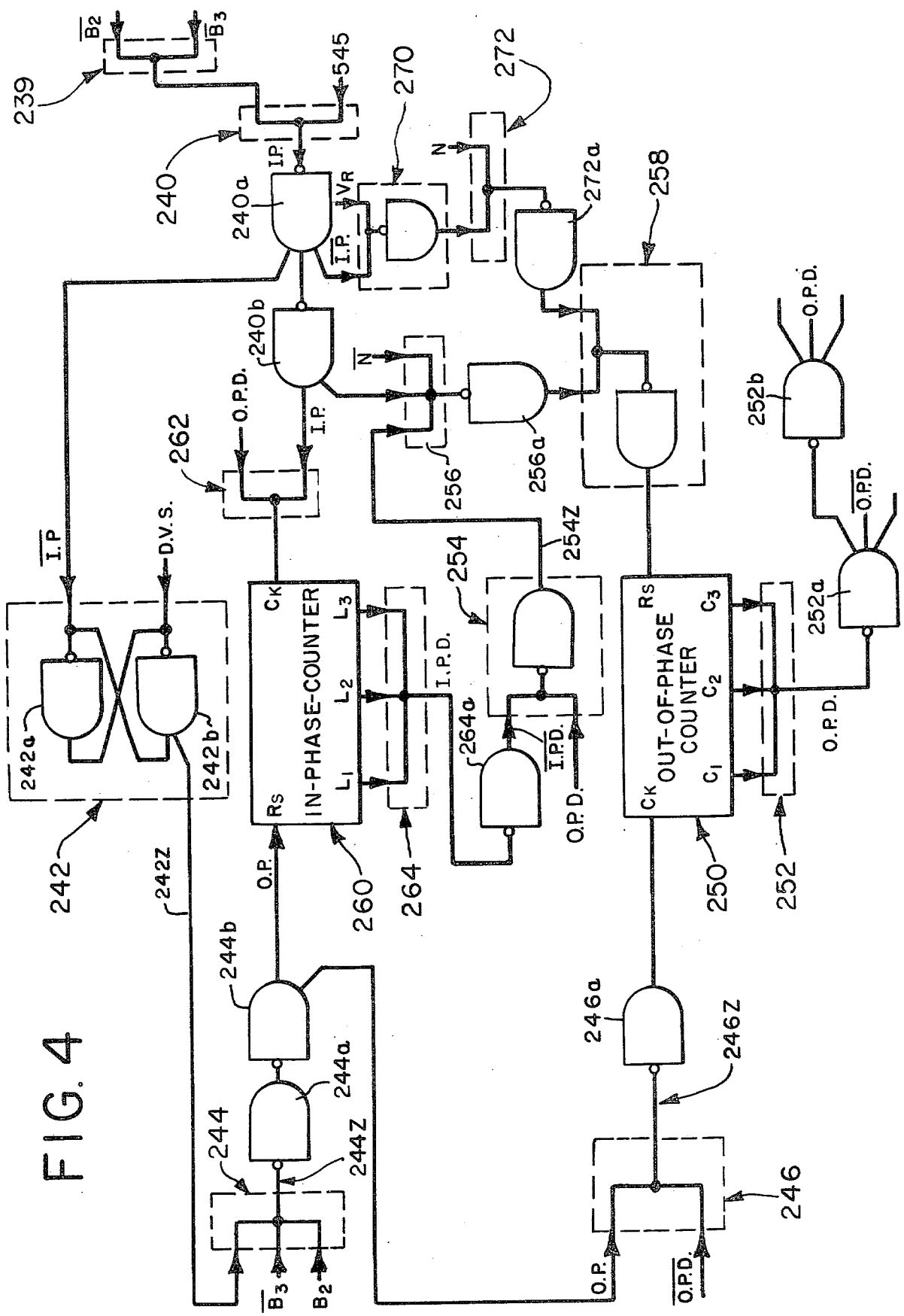
FIG. 4 is a circuit diagram in $I^2L$ notation of the phasing circuit of FIG. 3.

In FIG. 4 an in-phase detector 240 is the connection at the input of a NAND gate 240a receiving two inputs: a "545" input and an input $\overline{B}_3.\overline{B}_2$ from an AND gate 239. In the actual implementation of a digital vertical synchronization system, it has been found advantageous to preset line counter 50 to a count of twenty. Consequently, a signal on the "545" input represents that 525 counts have transpired on the line counter 50, and the "545" input corresponds to the "525" input used in FIGS. 2 and 3.

The $\overline{B}_3$ input is the same as the DVS output of derived vertical sync generator 106 of FIG. 2. Generator 106, as mentioned above, receives and processes an integrated vertical sync signal. The reader is referred to Cox et al. (IEEE 1977), pp. 317-18 for a detailed description of generator 106. Briefly, however, the integrated composite sync signal is processed and applied to a counter having outputs B1, B2, $\overline{B2}$, B3 and $\overline{B3}$. The counter is an eight state counter which is normally held in state seven. When the integrated vertical sync pulse is received and processed, the counter is clocked to the zero state. The outputs $\overline{B3}$ and $\overline{B2}$ go to the high level, and the counter is then clocked at the horizontal rate by signals $f_H$ until it reaches state four, terminating the $\overline{B3}$ pulse. Thus, $\overline{B3}$ is a positive-going pulse which starts when integrated composite sync crosses a threshold, the $\overline{B3}$ signal terminating three to four horizontal lines later depending on relative phasing of the threshold crossing and $f_H$. The $\overline{B2}$ pulse is also a positive-going pulse and starts with $\overline{B3}$ pulse but terminates one to two lines later.

Each of the three multiple collectors of gate 240a constitutes an $\overline{\text{I.P.}}$ output. One such output is coupled to a flip flop 242 comprising a pair of gates 242a and 242b cross-coupled in RS flip flop fashion. An output 242z of flip flop 242 comprises one input to a gate 244a whose other inputs are the $\overline{\text{B3}}$ and $\overline{\text{B2}}$ outputs of generator 106. The connection of the three signals at the input of gates 244a forms and AND gate 244. The output of this AND gate is O.P. (244z). The signal O.P. is twice inverted by gates 244a and 244b to provide two O.P. signals. One O.P. signal is inputted to an AND gate 246, whose other input is $\overline{\text{O.P.D}}$.

The output 246z of the AND gate 246 is used for clocking an out-of-phase counter 250. An inverter 246a is used as a driver for the clock input. The polarity of the signal on output 246z is not critical for the operation of the system. Counter 250 is a three stage binary counter clocked by high states in the output of gate 246. It has three outputs, C1, C2, and C3 which are coupled to the inputs of an AND gate 252. Thus, AND gate 252 functions as decoder because it decodes the state of the out-of-phase counter. The output of this AND gate is connected to a gate 252a to provide $\overline{\text{O.P.D.}}$, and one output of gate 252a is connected to a gate 252b to provide the O.P.D. output.

The in-phase counter 260 of FIG. 4 corresponds to in-phase counter 160 of FIG. 3. Counter 260 is a binary, three stage counter clocked by a signal corresponding to an AND function of the in-phase (I.P.) and out-of-phase detected (O.P.D.) signals. Specifically, a gate 262 receives a twice inverted I.P. signal from series-connected NAND gates 240a and 240b. Also, gate 262 receives an O.P.D. signal. The coupling arrangement of gate 262 operates as an AND gate, for when either one of the two input signals is low, the new input to the clock input CK of counter 260 is low. Only when both inputs are high will counter 260 be clocked.

Counter 260 has three outputs L1, L2, and L3 which are inputted to an AND gate 264 whose output corresponds to the in-phase detected output I.P.D. of FIG. 3. Its output is inverted by an NAND gate 264a to provide an inverted in-phase detected signal ($\overline{\text{I.P.D.}}$). This signal is applied to a gate 254, which also receives an O.P.D. signal. The output of gate 254 corresponds to the output of gate 154 of FIG. 3. Output 254z is coupled to one input of an AND gate 256. Other inputs to gate 256 are the $\overline{\text{N}}$ output and the I.P. signal from one of the multiple collectors of gate 240b. The output of AND gate 256 is inverted by a gate 256a and then coupled to one input of an OR gate 258. Gate 258 also receives signals from a gate 272a. The input of an OR gate 270 is $\overline{\text{IP}}$ from one of the multiple collectors of gate 240a. Another input to gate 270 is coupled to the VR output of vertical reset generator 108 of FIG. 2. The output of gate 270 is coupled to one input of AND gate 272. Another input of gate 272 is coupled to the output N of the noise detector 118 of FIG. 2. The output of gate 272, as shown in the drawing, is coupled to the input of gate 272a and the output of the gate 272a is coupled to the input of gate 258.

The circuit of FIG. 4 operates in the same manner as the circuit of FIG. 3. Specifically, the gate 240 of the in-phase detector detects the coincidence between the 545 high pulse generated by the line counter 50 and the $\overline{\text{B3}}.\overline{\text{B2}}$ pulse generated by the AND gate 239. If a coincidence between the two pulses occurs, the flip flop 242 is reset and will remain reset for the duration of the $\overline{\text{B3}}$ high signal. After the $\overline{\text{B3}}$ drops to low, flip flop 242 is set once again. Consequently, the output 242z of flip flop 242 during the period in which $\overline{\text{B3}}$ is high will stay low if an in-phase occurrence is detected. Otherwise, the signal on output 242z will stay high.

An out-of-phase occurrence is detected by AND gate 244. If an in-phase occurrence is not detected by gate 240, then during $\overline{\text{B3}}$, one input of gate 244 will be enabled by flip flop 242. The high state of B2, which is a 64 microsecond pulse generated by derived vertical sync generator 106, will appear at the output of gate 244. This will pass through gates 244a and 244b to serve two functions: (a) it will reset the in-phase counter 260, and (b) it will clock the out-of-phase counter 250, (assuming, of course, that an out-of-phase condition has not been detected).

In a no noise condition where N is set to low, when the digital vertical synchronization system of the present invention is properly in sync with the $\overline{\text{B3}}$ pulse, the out-of-phase counter 250 and the in-phase counter 260 both will be in state zero. If for any reason the video signal changes such that the ratio of the horizontal frequency to the vertical frequency is incorrect, although it still gives the proper number of equalizing pulses during the equalizing interval, then there will be no in-phase occurrence signal to reset counter 250, and the out-of-phase occurrence signals will clock counter 250 to state seven. That state seven of counter 250 results in the following:

(a) it disables the clock input of counter 250 to prevent it from rolling over to state zero;
(b) it enables the clock input of counter 260 so that whenever synchronization occurs, counter 260 can start counting;
(c) it disables the AND gate 256 and thereby disables the reset input of counter 250 so that until the counter 260 reaches its state seven and causes $\overline{\text{I.P.D.}}$ to go low, an in-phase signal will not reset counter 250; and
(d) it is coupled to and forces the mode recognition circuit 100 to shift to the non-standard mode.

When the horizontal to vertical frequency relationship is correct and the video signal is standard, then the in-phase signal will start to go high. A high in-phase signal will clock the in-phase counter 260. After seven consecutive in-phase occurrences, counter 260 will advance to its state seven causing I.P.D. to go high and $\overline{\text{I.P.D.}}$ to go low. This enables the AND gate 256 and allows the next in-phase occurrence to reset counter 250 and roll counter 260 over to state zero. When out-of-phase counter 250 resets to its zero state, it will:

(a) enable the clock input of counter 250;
(b) disable the clock input of counter 260 so that it stops clocking the in-phase counter;
(c) enable the reset input of counter 250; and
(d) remove the automatic forced mode condition from the mode recognition circuit 100 (FIG. 2).

In the event that the noise detector 118 determines that there is a noise condition and sets N to high, the counter 250 will receive a reset pulse via gates 270, 272 and 258. As discussed above, the system will not change its phase relationship from its previous operation unless seven consecutive out-of-phase signals O.P. are detected causing O.P.D. to go high, and thereby causing vertical reset generator 108 to generate VR, thus rephasing the line counter and resetting the out-of-phase counter 250.

Figure 5:
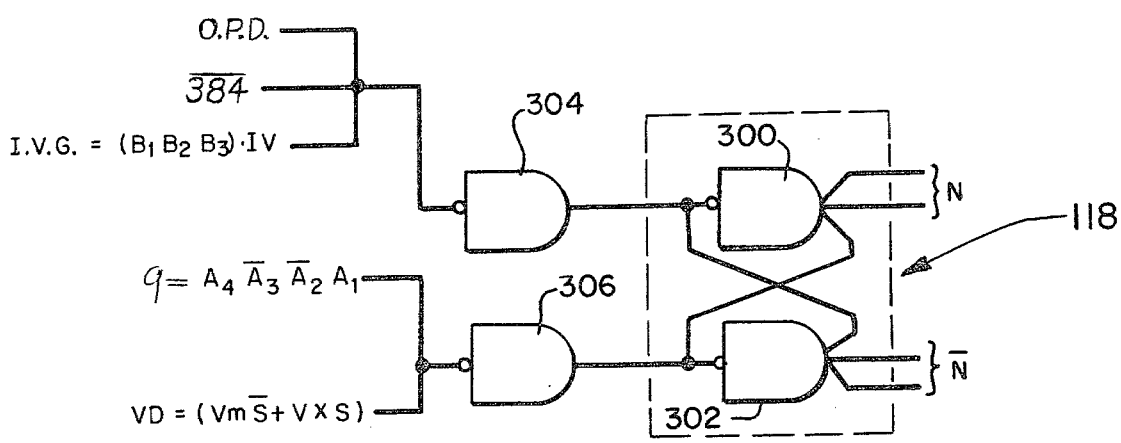
FIG. 5 is a circuit diagram in I²L notation of an illustrative embodiment of a noise detector shown as a block in FIG. 2.

FIG. 5 illustrates an embodiment of a noise condition detector 118 consisting of gates 300 and 302 cross-coupled in an RS flip flop fashion. A NAND gate 304 has its output coupled to one input of gate 300, and a gate 306 similarly has its output coupled to one input of gate 302. The inputs to gate 304 are O.P.D., $\overline{384}$ and (B1B2B3).IV. The latter pulse, which we call the integrated vertical glitch I.V.G., corresponds to any integrated vertical synchronization pulses that occur at the start of the integrated vertical pulse and terminates after the derived vertical sync generator 106 is reset. The inputs to gate 306 are an output (from line counter 50 stages) and an output "VD" (which is the output of OR gate 128 [FIG. 2]).

The operation of noise detector 118 is as follows: gate 304 is enabled for a time period corresponding to 364 (384-20) lines starting from the moment the line counter 50 is reset. The reset pulse starts at the leading edge of the high state of B1. That leading edge of the B1 high state is delayed with respect to the leading edge of the integrated vertical pulse. The amount of the delay is a function of the phase of the output pulses of divider 27 (FIG. 1) at the $2f_H$ rate, and the delay is in the range of 1.2 microseconds to 32 microseconds. The B1B2B3.IV input of gate 304 is a glitch whose duration, on the order of 300 nonoseconds, is small because the IV phase is teminated as soon as the B counter of generator 106 changes from state seven to state zero. The enablement of gate 304 is delayed with respect to the standard IV glitch because the vertical reset occurs at least 1.2 microseconds to 32 microseconds after the leading edge of the IV pulse. If the video signal is noisy, then there will be several IV glitch signals in addition to the standard IV signal during the enable period and they will pass through the gate 304 to set the flip flop formed by gates 300 and 302 so that the N output is set high to indicate a noisy condition.

FIG. 6 illustrates the mode recognition circuit 100 (FIG. 2) in greater detail. Mode recognition circuit 100 is described in Cox et al (IEEE 1977) at pp. 323-24. It is reproduced here to show the manner and apparatus by which mode recognition circuit 100 is forced into nonstandard mode of operation upon the detection of an out-of-phase condition in a no noise condition.

The operation of mode recognition circuit briefly is as follows. During a six line enablement period of the signal on input 122y to a pulse counter 400, pulses from a composite sync input 402 clock counter 400. During six lines of the vertical interval, a signal with equalizing pulses has twelve transitions which would clock a counter, while a nonstandard signal normally would have six transitions or fewer. If counter 400 reaches its ninth count, as decoded by gate 404, it resets a counter 406 having an associated NAND gate 408 which decodes state seven of counter 406. If the pulse counter 400 reaches state nine and counter 406 is thereby reset, the output of gate 408 will be kept in a high state. The signal outputted by gate 404 will pass through a gate 410 to a flip flop comprising gates 412 and 414 causing it to set its S output high. Because the output of gate 408 is kept at a high level, it will not affect the operation of the flip flop and therefore the S output of gate 412 will be high and the $\overline{S}$ output of gate 414 will be low.

For nonstandard signals, the pulse counter 400 does not reach state nine and counter 406, without being reset, will be clocked by the six line wide enabling signals, in the vertical interval, to state seven. This changes the output state of gate 408 which switches the flip flop gates 412 and 414 so that their outputs indicate a nonstandard state. It will be appreciated by those skilled in the art that setting the standard mode is done in one field, whereas it takes seven fields to reset to the nonstandard mode. This, of course, is a design choice and can be modified simply by rearranging the connections of decoder 408, for example.

For automatic forced nonstandard mode, mode recognition circuit 100 receives an input representing the detection of an non-noise condition together with the detection of an out-of-phase condition. An AND gate 430 corresponding to AND gate 130 of FIG. 2 receives an input C1C2C3 from the decoder 252 of counter 250 indicating an out-of-phase condition. A second input N to AND gate 430 indicates the non-noise condition when high. Upon the occurrence of a high level for both inputs to gate 430, its output will go high and thereby the NAND gate 430a output 432 drops to low and thereby prevents gate 410 from changing state. A second output 434 of the NAND gate 430a also drops to low and is coupled to one input of NAND gate 414, and causes gates 412 and 414 to switch to the nonstandard mode wherein S is low and $\overline{S}$ is high.

CONCLUSION

The improved digital vertical synchronization system is more versatile than those of the prior art. It can accept different types of nonstandard video signals which are encountered, for example, by a video tape recorder which would trick less sophisticated synchronization systems into standard mode. The illustrated embodiment of the improved digital vertical synchronization system accepts a wide range of nonstandard signals, specifically, from 46 to 86.5 Hertz. Additionally, the phasing circuit has been improved to detect whether the video has 525 lines per frame. A noise detector is included so that in the presence of noise, the synchronization system prefers the standard mode of operation.

In the standard mode of operation, the system provides excellent noise immunity for the vertical synchronization of the television picture. The line counter counts half line intervals, and a count of 525 for a standard video signal is one field. At the end of 525 counts, a reset pulse is generated to reset the line counter. Thus, the reset counter forms a very stable oscillator. This oscillator is phase corrected during selected times to the derived vertical sync signal. Inasmuch as it is not phased during every field, it is substantially immune to noise.

In a non-standard mode of operation, the noise immunity is less than perfect. The vertical drive for the television picture is triggered by the derived vertical synchronization pulse. There is, however, noise immunity of 182 lines. Although the prior system had a noise immunity of 246 lines, the improved arrangement increases the vertical sync acceptance window to cover a wider range of vertical frequencies.

Proper and reliable operation of the synchronization system must include reliable detection means to indicate when a video signal is standard and when it is not. The prior system counts the number of equalizing pulses during the vertical interval. Nine or more equalizing pulses counted by the mode recognition circuit indicated that the video signal was standard. In most cases that was sufficient for determining proper operation of the digital vertical synchronization system. However, there are instances when the video signal may have the proper number of equalizing pulses, but might not have 525 counts in one frame. In that event, nonstandard operation is preferable, and the phasing circuit of the present invention detects this situation and causes the mode recognition circuit to direct the system to a nonstandard mode.

This improvement in the phasing circuit, which improves the overall versatility of the digital vertical synchronization system, also degrades the noise immunity of the system. A noise detector is included to detect two or more sync pulses within a period of 182 lines. In the presence of a noise condition, the noise detector removes the automatic forced mode condition from the mode recognition circuit and sets a preference for the standard mode of operation.

Although a particular embodiment of the present invention has been shown and described, plainly it will be clear to those who are skilled in the art that various changes and modifications may be made to the illustrated embodiment without departing from the broader aspects of the invention. Accordingly, the aim in the appended claims is to cover all such changes and modifications as may fall within the true spirit and scope of the invention.

What is claimed is:

1. In a digital vertical synchronization system having a source of locally generated vertical sync pulses coupled to a vertical sweep system, a source of derived vertical sync pulses developed from and in a time relationship with received television signals, a phasing circuit for testing the time relationship between the derived vertical sync pulses and the locally generated vertical sync pulses, said phasing circuit outputting a signal indicative of the test, means responsive to the phasing circuit for adjusting the phase of the locally generated vertical sync pulses, and a mode recognition circuit for determining whether the received television signal includes equalizing pulses in a vertical interval, said mode recognition circuit having an output for indicating whether the digital synchronization system should operate in a standard mode wherein the phase of the locally generated vertical sync pulses is adjusted at a first rate or in a nonstandard mode wherein the phase of the locally generated vertical sync pulses is adjusted at a second rate lower than the first rate, the improvement comprising:

forced mode means, associated with said mode recognition circuit and responsive to the phasing circuit output signal, for automatically forcing said mode recognition circuit output to indicate nonstandard mode.

2. The improvement of claim 1 further comprising:
a noise detection circuit coupled to receive at least a portion of the television signals and having an output signal indicating whether noise is detected in the received television signal; and
logic means responsively coupling said noise detection circuit output to said forced mode means for preventing said forced mode means from forcing said mode recognition circuit into nonstandard mode despite said phasing circuit output signal.

3. The improvement of claim 2 wherein said logic means include a logic gate having at least an AND function operating on said phasing circuit output signal and said noise detection circuit output signal, the output of said logic gate being coupled to said forced mode means.

4. The improvement of claim 3 further comprising:
a manually operable switch;
logic means coupled to said forced mode means for permitting said forced mode means to respond to either one of said manually operable switch and said phasing circuit output signal.

5. In a digital vertical synchronization system having a source of locally generated vertical sync pulses coupled to a vertical sweep system, a source of derived vertical sync pulses developed from and in a time relationship with received television signals, means for adjusting the phase of the locally generated vertical sync pulses, and a mode recognition circuit for determining whether the received television signal includes equalizing pulses in a vertical interval, said mode recognition circuit having an output indicating whether the digital synchronization system should operate in a standard mode wherein the phase of the locally generated vertical sync pulses is adjusted at a first rate or in a nonstandard mode wherein the phase of the locally generated vertical sync pulses is adjusted at a second rate lower than the first rate, the improvement comprising:

a phasing circuit for testing the time relationship between the derived vertical sync pulses and the locally generated vertical sync pulses; and
means for automatically forcing said mode recognition circuit into nonstandard mode in response to determination by said phasing circuit that the time relationship between the derived vertical sync pulses and the locally generated sync pulses is beyond predetermined limits.

6. The improvement of claim 5 further comprising:
a noise detection circuit for determining whether noise is present on the received television signal; and
means responsive to the detection of noise by said noise detection circuit for withdrawing the automatic forced mode requirement for said mode recognition circuit.

7. The improvement of claim 5 or 6 wherein said phasing circuit comprises:
input means for receiving locally generated vertical sync pulses and derived vertical sync pulses for determining whether said two sets of pulses are in proper time registration;
out-of-phase counter means for counting the occurrences wherein said derived vertical sync pulses and said locally generated vertical sync pulses are not in proper time registration;
output means associated with said out-of-phase counter means for outputting a signal related to the state of said out-of-phase counting means; and
reset means associated with said out-of-phase counter means for delaying said out-of-phase counter means from reaching said state which will activate said output means associated therewith except by a sequence of consecutive occurrences of inproper time regristration between said derived vertical sync pulses and said locally generated vertical sync pulses.

8. The improvement of claim 7 wherein said reset means includes logic gate means responsive to the detection of noise by the noise detection circuit together with an occurrence of proper time registration between said derived vertical sync pulses and said locally generated vertical sync pulses, whereby said out-of-phase counter means will reset in a noise condition by an in-phase occurrence.

9. The improvement of claim 8 wherein said logic gate means alternatively responds to the detection of noise by said noise detection circuit, together with an occurrence of a reset signal from the means for adjusting the phase of the locally generated vertical sync pulses, whereby in a noise condition, said out-of-phase counter means will reset by the reset signal for phase-adjusting the locally generated vertical sync pulses.

10. The improvement of claim 7 or 8 wherein said reset means includes logic means responsive to: (a) the nondection of noise by said noise detection circuit, together with (b) an occurrence of proper time registration between said locally generated vertical sync pulses and said derived vertical sync pulses together with (c) a predetermined number of consecutive occurrences of proper time registration between said locally generated vertical sync pulses and said derived vertical sync pulses, whereby in a non-noise condition, the reset of the said out-of-phase counter means will be delayed by a sequence of consecutive in-phase occurrences.

11. The improvement of claim 10 wherein said logic means alternatively responds to: (a) the non-detection of noise by said noise detection circuit, together with (b) an occurrence of proper time registration between said locally generated and said derived vertical sync pulses, together with (c) a predetermined state of said out-of-phase counter means as indicated by the signal of said output means, whereby prior to said out-of-phase counter means entering said state, it will be delayed from entering said state in a non-noise condition by an in-phase occurrence.

12. The improvement of claim 6 wherein said noise detection circuit responds to noise signals during an enablement period and includes:
   a first noise input gate being coupled at an input to selected portions of said source of locally generated vertical sync pulses and to selected portions of said source of derived vertical sync pulses; and
   a second noise input gate receiving an input from other selected portions of said source of locally generated vertical sync pulses, said second noise input gate having another input tied to a trigger input of said vertical sweep system.

13. The improvement of claim 1, 2, 6 and 7 wherein said mode recognition circuit includes an RS flip flop at its output and a discriminator circuit coupled to the inputs of said RS flip flop, and wherein said forced mode means comprises means coupling a signal related to said phasing circuit output signal to said RS flip flop inputs.

14. A method for digitally vertically synchronizing a television receiver comprising:
   locally, digitally generating vertical sync pulses and coupling said pulses to the vertical sweep system of the television receiver;
   deriving vertical sync pulses from and in a time relationship with received vertical sync pulses;
   determining whether equalizing pulses are present to a predetermined extent in the received television signal;
   if said equalizing pulses are not present to said predetermined extent, then operating in a nonstandard mode by adjusting the phase of the locally generated vertical sync pulses to the phase of the derived vertical sync pulses at a first rate;
   determining whether the phase relationship between said locally generated vertical sync pulses and said derived vertical sync pulses is within predetermined parameters; and if so, causing said system to operate in a standard mode wherein the phase of the locally generated vertical sync pulses is adjusted at a second rate lower than said first rate, and if not, forcing said system to operate in non-standard mode despite the presence or absence of equalizing pulses; and
   determining whether noise is present in the received television signal; and if noise is determined to be present and said system is operating in nonstandard mode by resetting the phase of locally generated vertical sync pulses at said first frequency, then switching to standard mode.

15. A method in a digital vertical synchronization system which digitally locally develops vertical sync pulses which are applied to a vertical sweep system, derives vertical sync pulses from and in time relationship with received television sync pulses, tests the phase relationship between said locally generated vertical sync pulses and said derived vertical sync pulses, determines whether the received television signal includes equalizing pulses in the vertical interval to a certain extent, and operates in a nonstandard mode wherein the phase of said locally generated vertical sync pulses is adjusted at a first frequency, or in a standard mode wherein said phase is adjusted at a rate lower than said first frequency, the improvement comprising:
   automatically forcing said system into non-standard mode in response to a determination by the phasing circuit that the time relationship between the derived vertical sync pulses and the locally generated vertical pulses is beyond certain parameters.

16. The improvement of claim 15 further comprising:
   automatically withdrawing said forced mode requirement upon detection of noise in the received television signal by a noise detection circuit.

17. In a digital vertical synchronization system having a source of locally generated vertical sync pulses coupled to a vertical sweep system, a source of derived vertical sync pulses developed from and in a time relationship with received television signals, means for adjusting the phase of the locally generated vertical sync pulses, and a mode recognition circuit for determining whether the received television signal includes equalizing pulses in a vertical interval, said mode recognition circuit having an output indicating whether the digital synchronization system should operate in a standard mode wherein the phase of the locally generated vertical sync pulses is adjusted at a first rate or in a nonstandard mode wherein the phase of the locally generated vertical sync pulses is adjusted at a second rate lower than the first rate, the improvement comprising:
   forced mode means responsive to both the detection of equalizing pulses and reception of nonstandard signals for automatically putting the digital vertical synchronization system into nonstandard mode.

18. The improvement of claim 17 further comprising:
   a noise detection circuit for determining whether noise is present on the received television signal; and
   means responsive to the detection of noise by said noise detection circuit for withdrawing the automatic forced mode requirement.

* * * * *